United States Patent
Koshina et al.

(10) Patent No.: US 11,888,107 B2
(45) Date of Patent: Jan. 30, 2024

(54) LITHIUM-ION BATTERY CELL AND MODULE

(71) Applicant: CPS Technology Holdings LLC, New York, NY (US)

(72) Inventors: Hizuru Koshina, Bayside, WI (US); David R. Boone, Waukesha, WI (US)

(73) Assignee: CPS Technology Holdings LLC, New York, NY (US)

( * ) Notice: Subject to any disclaimer, the term of this patent is extended or adjusted under 35 U.S.C. 154(b) by 427 days.

(21) Appl. No.: 16/762,084

(22) PCT Filed: Oct. 29, 2018

(86) PCT No.: PCT/US2018/057969
§ 371 (c)(1),
(2) Date: May 6, 2020

(87) PCT Pub. No.: WO2019/094215
PCT Pub. Date: May 16, 2019

(65) Prior Publication Data
US 2021/0376374 A1 Dec. 2, 2021

Related U.S. Application Data

(60) Provisional application No. 62/582,558, filed on Nov. 7, 2017.

(51) Int. Cl.
*H01M 10/0525* (2010.01)
*H01M 50/429* (2021.01)
(Continued)

(52) U.S. Cl.
CPC ....... *H01M 10/0525* (2013.01); *H01M 4/485* (2013.01); *H01M 4/505* (2013.01);
(Continued)

(58) Field of Classification Search
CPC ......... H01M 10/0525; H01M 50/4295; H01M 4/485; H01M 4/505; H01M 4/525;
(Continued)

(56) References Cited

U.S. PATENT DOCUMENTS

| | | | |
|---|---|---|---|
| 2015/0171477 A1* | 6/2015 | Takahashi | H01M 4/505 429/341 |
| 2015/0244026 A1* | 8/2015 | Chen | H01M 10/0525 429/303 |
| 2018/0048014 A1 | 2/2018 | Sugimori et al. | |

FOREIGN PATENT DOCUMENTS

| | | |
|---|---|---|
| CN | 102823030 A | 12/2012 |
| CN | 104221206 A | 12/2014 |

(Continued)

OTHER PUBLICATIONS

PCT/US2018/057969 International Search Report and Written Opinion dated Oct. 29, 2018.

(Continued)

*Primary Examiner* — Stewart A Fraser
(74) *Attorney, Agent, or Firm* — Boardman & Clark LLP

(57) ABSTRACT

An electrochemical cell is provided. The electrochemical cell includes a positive electrode including a first lithium metal-based material, the first lithium metal-based material including one or more transition metal ions, and wherein the positive electrode has an operating voltage of 4.5 volts versus lithium metal potential or greater. The electrochemical cell also includes an electrolyte formed from ingredients comprising a solvent and lithium salt. The solvent includes at least one carbonic ester. The electrochemical cell further includes a negative electrode including a second lithium metal-based material, the second lithium metal-based material including one or more transition metal ions.

20 Claims, 3 Drawing Sheets

(51) Int. Cl.
*H01M 4/485* (2010.01)
*H01M 4/505* (2010.01)
*H01M 4/525* (2010.01)
*H01M 4/58* (2010.01)
*H01M 10/0568* (2010.01)
*H01M 10/0569* (2010.01)
*H01M 4/02* (2006.01)

(52) U.S. Cl.
CPC ......... *H01M 4/525* (2013.01); *H01M 4/5815* (2013.01); *H01M 4/5825* (2013.01); *H01M 10/0568* (2013.01); *H01M 10/0569* (2013.01); *H01M 50/429* (2021.01); *H01M 50/4295* (2021.01); *H01M 2004/027* (2013.01); *H01M 2004/028* (2013.01); *H01M 2220/20* (2013.01); *H01M 2300/0028* (2013.01)

(58) Field of Classification Search
CPC ........... H01M 4/5815; H01M 10/0568; H01M 10/0569; H01M 2004/027; H01M 2004/028; H01M 2220/20; H01M 2300/0028
See application file for complete search history.

(56) References Cited

FOREIGN PATENT DOCUMENTS

| | | |
|---|---|---|
| CN | 104471780 A | 3/2015 |
| CN | 104662716 A | 5/2015 |
| EP | 2822083 A1 | 7/2015 |
| JP | 2017069139 A | 4/2017 |
| WO | 2016170756 A1 | 10/2016 |

OTHER PUBLICATIONS

S A Novikova et al: "29 Cathode materials based on olivine lithium iron phosphates for lithium-ion batteries Cathode Materials Based on Olivine Lithium Iron Phosphates for Lithium-Ion Batteries", Rev. Adv. Mater. Sci, vol. 49, Jan. 1, 2017 (Jan. 1, 2017), pp. 129-139, XP055532978, p. 129.

Steve J. Clark et al: "Li(V0.5Ti0.5)SZ as a 1?V lithium intercalation electrode", Nature Communications, vol. 7, No. 1, Mar. 21, 2016 (Mar. 21, 2016), XP055532981, DOI: 10.1038/ncomm510898 abstract.

* cited by examiner

LITHIUM-ION BATTERY CELL AND MODULE

CROSS-REFERENCE TO RELATED APPLICATIONS

This application is a national phase filing of International Patent Application No. PCT/US2018/057969 entitled "LITHIUM-ION BATTERY CELL AND MODULE", which has an international filing date of Oct. 29, 2018, and which claims priority from and the benefit of U.S. Provisional Application Ser. No. 62/582,558, entitled "LITHIUM-ION BATTERY CELL AND MODULE," filed Nov. 7, 2017, the content of each of which is hereby incorporated by reference in its entirety herein for all purposes.

BACKGROUND

The present disclosure relates generally to the field of batteries and battery modules. More specifically, the present disclosure relates to lithium-ion (Li-ion) battery cells that can be used with battery modules.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. As technology continues to evolve, there is a need to provide improved power sources, particularly battery modules, for such vehicles. For example, battery modules that include battery cells with relatively high nominal voltages may reduce the size and cost of the battery module because fewer battery cells are included within the battery module. However, the performance of a lithium-ion cell with cathodes having voltages over 4.3 volts (V) is highly dependent upon the stability of the electrolyte. Since the primary solvents in the electrolyte are cyclic and linear carbonates, their oxidative reactions with the cathode surface can lead to irreversible losses and server capacity fading. Such reactions are usually limited by either replacing those solvents with more stable ones that can be fluorinated, or by using additives that can form a protective layer on the oxidized electrode surface.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present embodiments are directed to, among other things, an electrochemical cell. The electrochemical cell includes a positive electrode including a first lithium metal-based material, the first lithium metal-based material including one or more transition metal ions, wherein the positive electrode has an operating voltage of 4.5 volts or greater. The electrochemical cell also includes an electrolyte formed from ingredients comprising a solvent and lithium salt. The solvent includes at least one carbonic ester. The electrochemical cell further includes a negative electrode including a second lithium metal-based material, the second lithium metal-based material including one or more transition metal ions.

Present embodiments are also directed to a battery module. The battery module includes multiple electrochemical cells. Each electrochemical cell includes a positive electrode including a first lithium metal oxide material or a stabilized lithium metal phosphate material, the first lithium metal oxide material and the lithium metal phosphate material each including one or more transition metal ions. Each electrochemical cell also includes an electrolyte formed from ingredients including a solvent and lithium salt. The solvent includes at least one carbonic ester. Each electrochemical cell further includes a negative electrode including a second stabilized lithium metal oxide material or a stabilized lithium metal sulfide material, the second lithium metal oxide material and the lithium metal sulfide material each including one or more transition metal ions.

DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As technology continues to evolve, there is a need to provide improved power sources, particularly battery systems, for vehicles. The battery systems described herein may be used to provide power to various types of electric vehicles (xEVs). Such battery systems may include one or more battery modules, each battery module having a number of battery cells (e.g., lithium-ion (Li-ion) battery cells) to provide particular voltages and/or currents useful to power, for example, one or more components of an xEV.

Present embodiments are, in some aspects, more specifically directed toward an electrochemical cell that utilizes an electrolyte with a stable electrochemical window in the presence of a high voltage cathode (4.5 V or greater). In particular, the electrolyte may include one or more carbonic esters. In addition, the electrolyte may include one or more cyclic carbonates with high voltage stability. The formulation of the electrolyte in conjunction with the high voltage cathode and a lithium metal-based oxide or lithium metal-based sulfide anode (e.g., having an operating voltage greater than a typical anode material such as graphite) increase the stability (e.g., in the presence of high temperatures) of the electrochemical cell having a cell potential or voltage of 3V or greater. As a result, the number of cells and, thus, the costs of batteries utilizing these electrochemical cells may be reduced.

Figure 1:
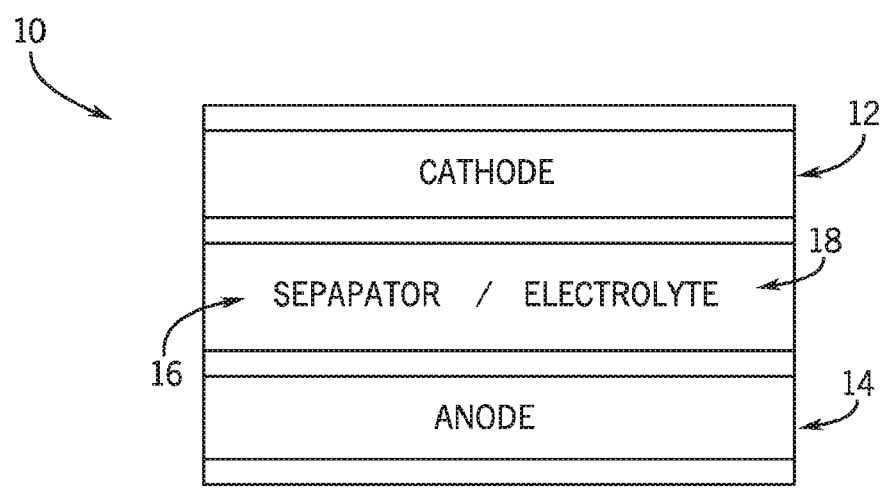
FIG. 1 is a schematic view of a lithium ion battery in accordance with an aspect of the present disclosure.

FIG. 1 is a schematic view of an embodiment of a lithium ion battery 10. As depicted, the lithium ion battery includes a single battery cell or electrochemical cell. In other embodiments, the lithium ion battery 10 may include a plurality of cells forming the battery 10. A plurality of batteries 10 may form a battery module. The battery 10 may be utilized in any device that operates at high temperatures and requires high output, e.g., in a laptop computer, a smart phone, electric vehicle, and the like. The battery 10 may have high discharge capacity and improved high rate characteristics, and thus may be applicable in an electric vehicle (e.g., in a hybrid vehicle or a plug-in hybrid electric vehicle). The battery may be applicable to a high-power storage field (e.g., an electric bicycle, a power tool, etc.) The battery 10 may be part of a battery system such as a 12V lithium ion battery starter, a 12V dual energy storage system, a 48V battery such as a 48V mild hybrid battery, or any voltage application of 60V or less (e.g., including low and high voltage applications). The battery 10 may be arranged in a cylindrical cell or prismatic cell or pouch cell.

The depicted lithium ion battery 10 includes a positive electrode or cathode 12, a negative electrode or anode 14, and a separator 16 disposed between the anode 14 and the cathode 12. The battery 10 also includes an electrolyte 18, which is disposed between the anode 14 and the cathode 12 and is formulated to remain stable at high temperatures (e.g., as experienced in a vehicle). As configured, the formulation of the electrolyte 18 and the materials of the anode 14 and the cathode 12 enable the battery 10 or cell to operate at a higher cell potential (i.e., voltage difference between the cathode 14 and the anode) (e.g. 3.0 volts (V) or greater). In addition, the disclosed embodiments may reduce costs by enabling a reduction in the stack cell number.

The operation of the battery 10 is based upon reversible intercalation and de-intercalation of lithium ions into and from host materials of the anode 14 and the cathode 12. The voltage of the battery 10 is based on redox potentials of the anode 14 and the cathode 12, where lithium ions are accommodated or released at a lower potential in the former and a higher potential in the latter.

The cathode 12 includes a high voltage cathode (e.g., nominal or operating voltage of 4.5 or greater). For example, the cathode 12 may include a lithium metal-based material that includes one or more transition metal ions. In certain embodiments, the lithium metal-based material may include a stabilized lithium metal oxide material such as lithium nickel manganese oxide: $LiNi_{1/3}Mn_{2/3}O_4$ (LNMO). The LNMO may include other stoichiometric ratios. In certain embodiments, the lithium metal-based material may include a stabilized lithium metal phosphate such as lithium cobalt phosphate $LiCoPO_4$ (LCP) or lithium nickel phosphate $LiNiPO_4$ (LNP). The LNMO, LCP, and LNP cathodes include operating voltages of approximately 4.7V, 4.8V, and 5.1V vs. lithium metal potential, respectively.

The anode 14 includes a lithium metal-based material that includes one or more transition metal ions. In certain embodiments, the lithium metal-based material may include a stabilized lithium metal oxide material such as lithium titanate: $Li_4Ti_5O_{12}$ (LTO). The LTO may include other stoichiometric ratios. In certain embodiments, the lithium metal-based material may include a stabilized lithium metal sulfide such as lithium titanium vanadium sulfide (LTVS), specifically such as $Li(TiV)S_2$. The LTO and LTVS anodes include operating voltages of approximately 1.5 V and 1.0 V vs. lithium metal potential, respectively. The operating voltages of the LTO and LTVS anodes are higher than graphite anodes. The LTO and LTVS anodes enable certain organic solvents (e.g., carbonic esters) to be utilized in the electrolyte 18 that typically may not be utilized due to their lower stability for reduction by typical anode material (e.g., graphite).

The formulation of the electrolyte 18 is configured to provide a stable electrochemical window for utilization with a high voltage cathode (e.g., 4.5 V or greater). The electrolyte 18 includes one or more organic solvents and lithium salts. The solvent includes at least one carbonic ester. For example, the electrolyte 18 may include methyl carbonic esters such as methyl acetate (MA), methyl propionate, and/or methyl butyrate (MB). In certain embodiments, the carbonic ester may include carbonic esters that include a methyl-alternative ethyl-group such as ethyl methyl carbonic ester. The carbonic esters may be utilized as a co-solvent or main solvents due to a higher operation potential (i.e., lower reduction power) of the LTO or LTVS cathode (e.g., versus graphite which is typically utilized for the cathode material). The electrolyte 18 may also include γ-butyrolactone (GBL) as a solvent. GBL has properties similar to the carbonic esters. In addition, the electrolyte may include one or more of propane sultone (PS), lithium bis(oxalato)borate (LiBOB), lithium difluoro(oxalato)borate (LiDFOB), vinyl ethylene carbonate (VEC).

The organic solvents may also include cyclic carbonates with high voltage stability. For example, the cyclic carbonates may include ethylene carbonate (EC) and/or propylene carbonate (PC). The utilization of the LTO or LTVS cathode in conjunction with one or more carbonic esters and/or GBL enables the utilization of EC and/or PC in the electrolyte 18. Each organic solvent in the electrolyte 18 may be included in an amount from approximately 1 to 90 wt % based on the total weight of the electrolyte without EC which is approximately 1 to 50 wt %. In certain embodiments, the solvents of the electrolyte 18 may include at least one carbonic ester, EC and/or PC, and GBL.

Non-limiting examples of the lithium salts that may be utilized in the electrolyte 18 include $LiPF_6$, $LiBF_4$, $LiSbF_6$, $LiClO_4$, $LiF_3SO_3$, $LiC_4F_9SO_3$, $LiN(SO_2F)_2$, $LiN(SO_2CF_3)_2$, $LiN(SO_2C_2F_5)_2$, $LiN(SO_2CF_3)(SO_2C_2F_5)$ $LiAlO_4$, $LiAlCl_4$, LiCl, LiI, or combinations thereof or include ammonium salts such as $t-Bt_4NPF_6$, $t-Bt_4NBF_4$, $t-Bt_4ClO_4$ and ionic liquids. Typical lithium salt concentration range from approximately 0.1 to 2.0 M.

The separator 16 may include any separator commonly used in lithium ion batteries. A suitable separator may have low resistance to ion movement of the electrolyte and high electrolyte retaining capability. Non-limiting examples of the suitable separators include glass fibers, polyester, Teflon, polyethylene, polypropylene, polytetrafluoroethylene, and combinations thereof, each of which can be a woven or non-woven fabric. For example, foldable separators formed of polyethylene or polypropylene can be used in lithium ion batteries. In certain embodiments, the separator may be made of cellulose.

The composition of the electrolyte 18 (in particular, the solvents) increases the stability of the electrochemical window for higher cell potentials (e.g., 3.0 V or greater). The combination of the electrolytic formulation above along with the high voltage cathode (e.g., LNMO, LCP, or LNP) and the anode (e.g., LTO or LTVS) enables an electrochemical cell with higher stability for higher cell potentials (e.g., 3.0 V or greater). In addition, this higher voltage can reduce stack cell number resulting in cost reduction and a stable cell performance at high temperatures (e.g., experienced in a vehicle).

A method of producing the electrochemical cell 10 will now be described. First, a cathode active material, a conducting agent, a binder, and a solvent are mixed to prepare a cathode composition that provides a high voltage cathode. The cathode active material may include a stabilized lithium metal oxide (e.g., LNMO) or a stabilized lithium metal phosphate (e.g., LCP or LNP). The cathode composition can be coated directly on a current collector and dried to prepare a cathode plate. Alternatively, the composition can be cast on a separate support to form a cathode composition film, which film is then peeled from the separate support and laminated on a current collector to prepare a positive electrode plate. One commonly used conducing agent is carbon black, carbon fiber or nano carbon tubes. Examples of binders include vinylidene fluoride/hexafluoropropylene copolymers, polyvinylidenefluoride (PVDF), polyacrylonitrile, polymethylmethacrylate, polytretrafluroethylene, and combination thereof. The binder may also be a styrene butadiene rubber-based polymer. Example solvents include N-methylpyrrolidone, acetone, water, and the like.

Then, an anode active material, a conducting agent, a binder, and a solvent are mixed to prepare an anode composition. The anode composition can be coated directly on a current collector to obtain an anode plate. Alternatively, the anode composition can be cast on a separate support to form an anode composition film, which film is then peeled from the separate support and laminated on a current collector to obtain a negative electrode plate. The anode active material may include a stabilized lithium metal oxide (e.g., LTO) or a stabilized lithium metal sulfide (e.g., LTVS). In the anode composition, the conducting agent, the binder, and the solvent may be the same as used in the cathode. In some cases, a plasticizer may be added to the cathode active material composition and the anode active material composition to form pores in the electrode plates.

A polymer resin, a filler, and a solvent are mixed to prepare a separator composition. The separator composition can be coated directly on an electrode and dried to form a separator film. Alternatively, the separator composition can be cast on a support and dried to form a separator composition film, which film is then peeled from the separate support and laminated on an electrode. The polymer resin is not limited and can be any material used as a binder for an electrode plate. Non-limiting examples of suitable polymer resins include vinylidenefluoride/hexafluoropropylene copolymers, polyvinylidenefluoride, polyacrylonitrile, polymethylmethacrylate, and combinations thereof. Mixture of above polymer resins with compounds such as alumina powder, magnesia powder and polymer beads composition can be coated directly on the electrode and dried to form a separator film. Alternatively, the separator composition can be cast on a support and dried to form a separator composition film, which film is then peeled from the separate support and laminated on an electrode. In certain embodiments, the separator may be made of cellulose.

Figure 2:
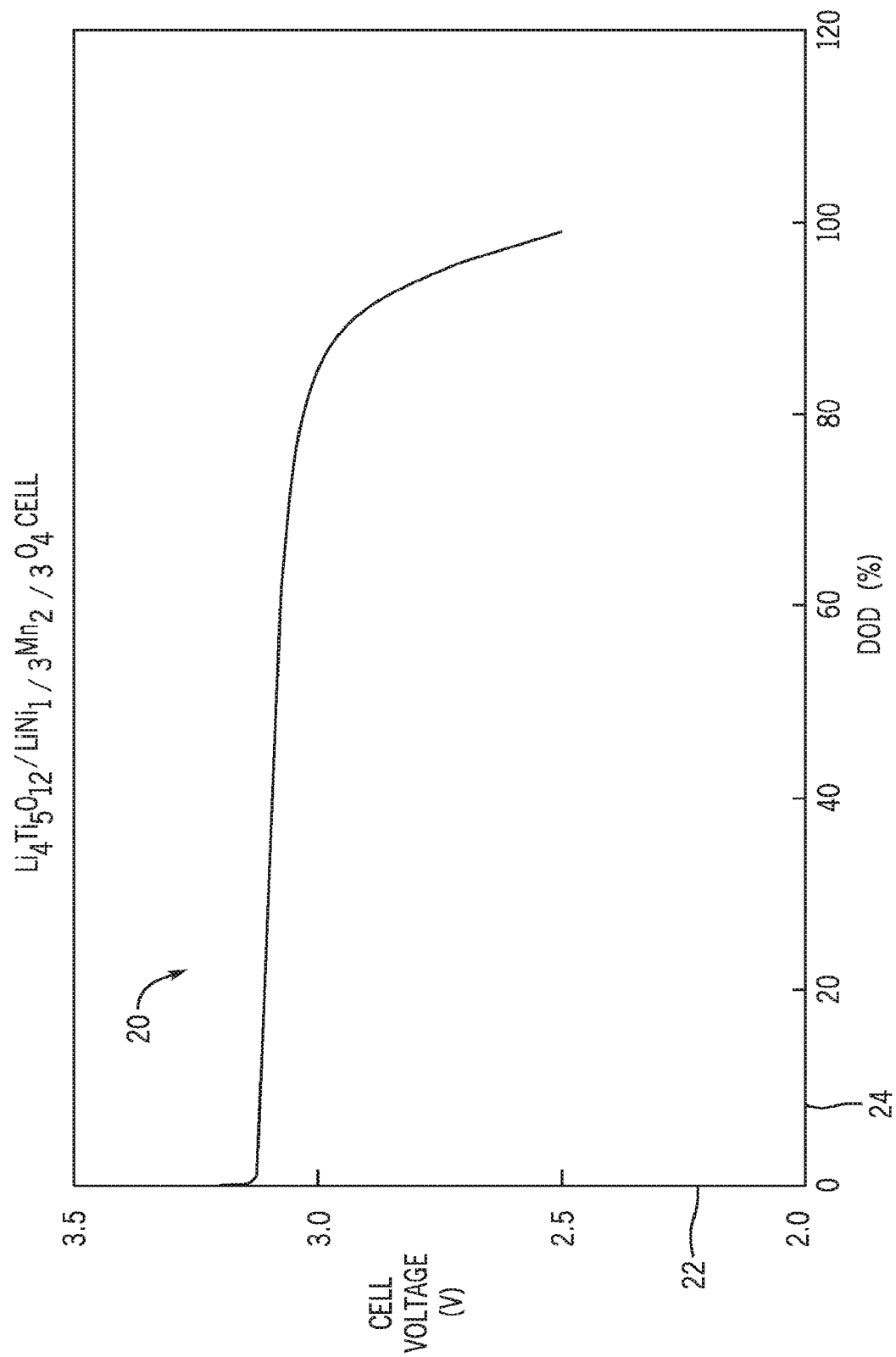
FIG. 2 is a graphical representation of a discharge curve for an electrochemical cell (e.g., $Li_4Ti_5O_{12}/LiNi_{1/3}Mn_{2/3}O_4$), in accordance with an aspect of the present disclosure.

FIG. 2 illustrates a discharge curve 20 for an electrochemical cell (e.g., $Li_4Ti_5O_{12}/LiNi_{1/3}Mn_{2/3}O_4$). The y-axis 22 represents the cell voltage (e.g., potential difference between the cathode and anode) and the x-axis 24 represents the depth of discharge (DOD) in percentage of maximum capacity. The electrochemical cell utilizes a high voltage LNMO cathode (e.g., 4.7V), and a LTO anode (e.g., 1.5V). As depicted, the cell maintains a voltage of at least 3.2V along a majority of the curve (e.g., until near approximately 80 percent DOD) indicating the stability of the cell.

Figure 3:
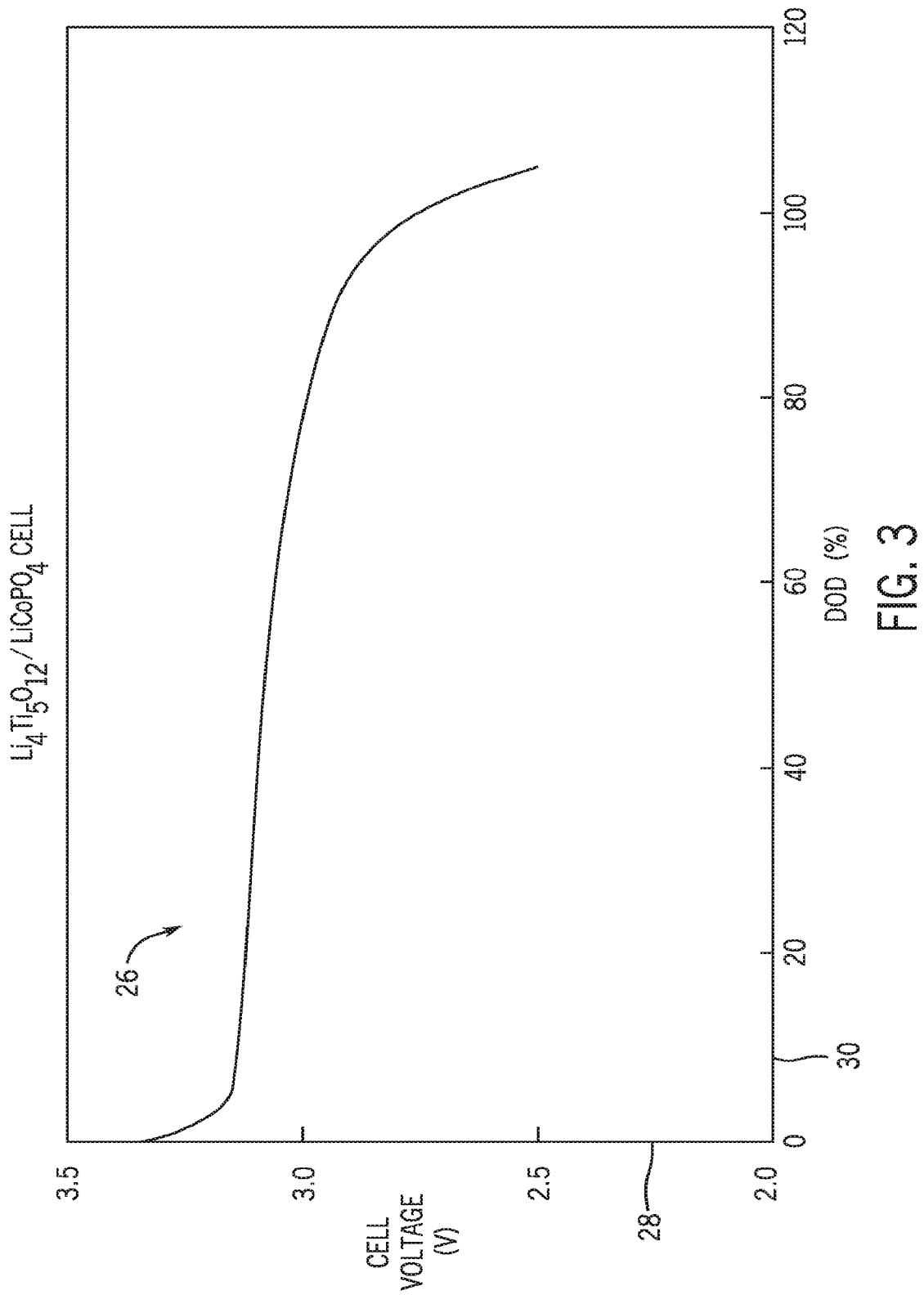
FIG. 3 is a graphical representation of a discharge curve for an electrochemical cell (e.g., $Li_4Ti_5O_{12}/LiCoPO_4$), in accordance with an aspect of the present disclosure.

FIG. 3 illustrates a discharge curve 26 for an electrochemical cell (e.g., $Li_4Ti_5O_{12}/LiCoPO_4$). The y-axis 28 represents the cell voltage (e.g., potential difference between the cathode and anode) and the x-axis 30 represents the DOD in percentage of maximum capacity. The electrochemical cell utilizes a high voltage LCP cathode (e.g., 4.8V) and a LTO cathode (e.g., 1.5V). As depicted, the cell maintains a voltage of at least 3.3V along a majority of the curve (e.g., until near approximately 80 percent DOD) indicating the stability of the cell.

One or more of the disclosed embodiments, alone or in combination, may provide one or more technical effects including providing an electrochemical cell or battery that includes a stable electrolyte formulation in the presence of a high voltage cathode. Such an electrochemical cell may reduce the stack cell number in batteries resulting in cost reduction. In addition, such an electrochemical cell may stabilize cell performance in presence of high temperatures (e.g., in a vehicle). The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. An electrochemical cell, comprising:
   a positive electrode comprising a first lithium metal-based material, the first lithium metal-based material comprising one or more transition metal ions, wherein the positive electrode has an operating voltage of 4.5 volts versus lithium metal potential or greater;
   an electrolyte formed from ingredients comprising a solvent and lithium salt, wherein the solvent comprises at least one carbonic ester;
   a negative electrode comprising a second lithium metal-based material, the second lithium metal-based material comprising one or more transition metal ions; and
   a combination of the positive electrode, the negative electrode and the electrolyte composition having a cell potential maintenance of at least 3.0 V up to substantially 80% depth of charge.

2. The electrochemical cell of claim 1, wherein the at least one carbonic ester comprises a methyl carbonic ester or an ethyl methyl carbonic ester.

3. The electrochemical cell of claim 1, wherein the at least one carbonic ester comprises methyl acetate, methyl propionate, or methyl butyrate.

4. The electrochemical cell of claim 1, wherein the solvent comprises ethylene carbonate and propylene carbonate.

5. The electrochemical cell of claim 1, wherein the solvent comprises γ-butyrolactone (GBL).

6. The electrochemical cell of claim 1, where the solvent comprises ethylene carbonate, propylene carbonate, and GBL.

7. The electrochemical cell of claim 1, wherein at least one of the first lithium metal-based material and the second lithium metal-based material comprises a stabilized lithium metal oxide material.

8. The electrochemical cell of claim 7, wherein the stabilized lithium metal oxide material comprises lithium nickel manganese oxide.

9. The electrochemical cell of claim 7, wherein the stabilized lithium metal oxide material comprises lithium titanium oxide.

10. The electrochemical cell of claim 1, wherein the first lithium metal-based material comprises a stabilized lithium metal phosphate material.

11. The electrochemical cell of claim 10, wherein the stabilized lithium metal phosphate material comprises lithium cobalt phosphate.

12. The electrochemical cell of claim 10, wherein the stabilized lithium metal phosphate material comprises lithium nickel phosphate.

13. The electrochemical cell of claim 1, the second lithium metal-based material comprises a stabilized lithium metal sulfide material, wherein the stabilized lithium metal sulfide material comprises lithium titanium vanadium sulfide.

14. The electrochemical cell of claim 1, comprising a cellulose separator.

15. A vehicle comprising the electrochemical cell of claim 1.

16. An automotive battery comprising the electrochemical cell of claim 1.

17. The electrochemical cell of claim 1, wherein at least one of the at least one carbonic ester is ethylene carbonate at 1 to 50 wt % of the electrolyte.

18. A battery module, comprising:
a plurality of electrochemical cells, each electrochemical cell comprising:
a positive electrode comprising a first stabilized lithium metal oxide material or a stabilized lithium metal phosphate material, the first stabilized lithium metal oxide material and the stabilized lithium metal phosphate material each comprising one or more transition metal ions;
an electrolyte formed from ingredients comprising a solvent and a lithium salt, wherein the solvent comprises at least one carbonic ester, with at least one of the at least one carbonic ester being ethylene carbonate at 1 to 50 wt % of the electrolyte;
a negative electrode comprising a second stabilized lithium metal oxide material or a stabilized lithium metal sulfide material, the second stabilized lithium metal oxide material and the stabilized lithium metal sulfide material each comprising one or more transition metal ions; and
a combination of the positive electrode, the negative electrode and the electrolyte having a cell potential maintenance of at least 3.0 V up to substantially 80% depth of charge.

19. The battery module of claim 18, wherein the positive electrode has an operating voltage of 4.5 volts versus lithium metal potential or greater.

20. The battery module of claim 18, wherein the battery module comprises a 48-volt lithium ion battery module.

* * * * *